Nov. 3, 1931.  C. W. KURIE, JR., ET AL  1,830,516
COMPOUND SPIRAL
Filed Oct. 22, 1929  3 Sheets-Sheet 1

INVENTOR.
Charles W. Kurie, Jr.
Clement W. Ankeny
BY Rollandet & Stratton
ATTORNEYS.

Nov. 3, 1931.  C. W. KURIE, JR., ET AL  1,830,516
COMPOUND SPIRAL
Filed Oct. 22, 1929  3 Sheets-Sheet 2

INVENTORS,
Charles W. Kurie, Jr.
Clement W. Ankeny
BY Rolland & Stratton,
ATTORNEYS.

Patented Nov. 3, 1931

1,830,516

UNITED STATES PATENT OFFICE

CHARLES W. KURIE, JR., AND CLEMENT W. ANKENY, OF COLORADO SPRINGS, COLORADO

COMPOUND SPIRAL

Application filed October 22, 1929. Serial No. 401,569.

This invention relates to apparatus of that type wherein a mass of material contained in a tank, or the like, of cylindrical form is moved towards a central orifice in the floor of such tank for delivering therethrough, the material being of such character that it will not, of itself, flow toward such orifice but must be pushed or scraped in that direction. Such motion is requisite in certain types of thickeners, filters and clarifiers employed in the separation of solids out of liquid suspension.

Very peculiar functions are essential in the performance of a scraper blade used for this purpose as can be understood if it be considered that a layer of material resting on the floor of such a tank and divided into concentric portions or zones of equal width will contain in each zone a volume equal to $t\pi R^2 - t\pi r^2$, where $t$ is the thickness of the layer, $r$ the minor radius of the zone and $R$ the major radius of the zone. The ratio of the volumes of the zones varies as the squares of their median radii since such volumes equal $t\pi(R^2-r^2)2$ or $t\pi Ro$ where $Ro$ is the median radius of the zone. Considering two zones adjacent each other which have radii of 1 and 2 respectively, there will be four times as much material in the outer zone as in the inner zone. In the formation of a scraper for moving such material uniformly through both zones so that the amount of material delivered from the outer zone to the inner zone exactly replaces the amount of material delivered from the inner zone to the orifice, the shape of that portion of the scraper blade travelling over the particular zone must be so proportioned that the angle of attack between the face of the blade and a tangent to the circle of the median radius is such the radial component of the force exerted by the blade on the mass in the outer zone is one-fourth that exerted by the blade on the mass in the inner zone. Assuming that the number of zones are infinite and of infinitesimal widths, it will be obvious that this angle of attack must change at every point on the scraper so that the form of the scraper is a curve.

It has been found that an appropriate form of curve for this purpose, that is one in which the scraping angle increases as the curve approaches the central orifice, is a parabolic spiral.

However, it is not found advisable to construct the scraper throughout with such a curve since, with adjacent zones of considerable radii the difference in volume is relatively slight compared to the volume to be moved and accordingly a spiral in which the angle of attack is uniform may well be used or even a spiral in which the angle of attack decreases as the radius decreases may be found advisable. Even a combination of both the constant angle of attack and the decreasing angle of attack may be used with much advantage.

Accordingly, the principal object of the present invention is to improve the form of scraper blades for the purpose set forth so that the movement inwardly of the mass to be delivered centrally will be such as to ensure a constant and even rate of delivery.

With the above and other objects in view, as will be hereinafter apparent, the invention consists, in general, of certain novel details of construction hereinafter fully described, illustrated in the accompanying drawings, and specifically claimed.

In the accompanying drawings, like characters of reference indicate like parts in the several views, and :—

Figure 3:
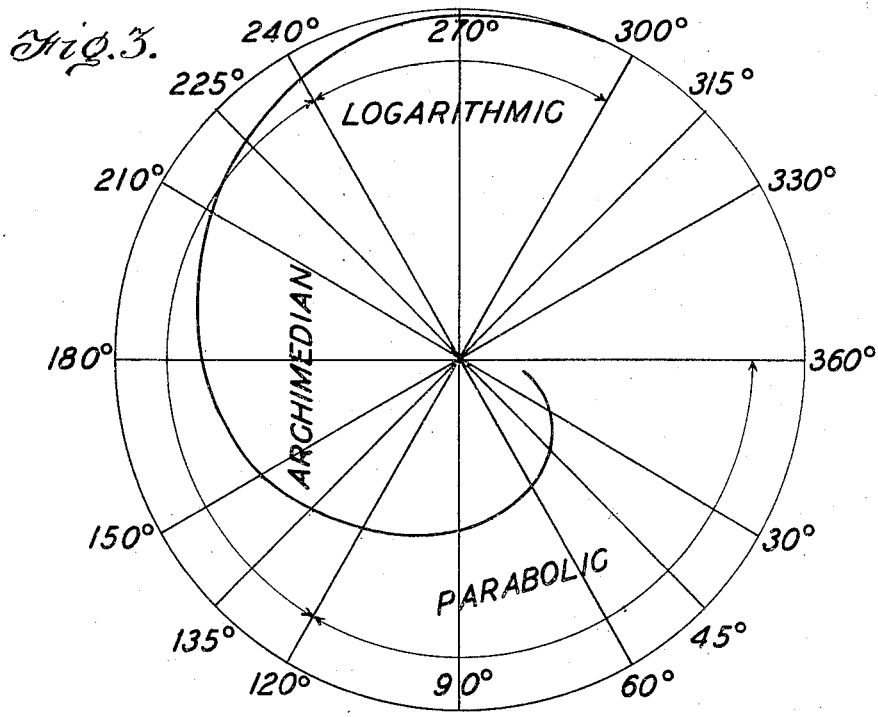
Figure 3 is a diagrammatic layout of the curve of one form of the improved scraper.

The invention is here shown as used in connection with the apparatus known as a Dorr thickener, the same being set forth in a Patent No. 1,237,745, issued to the Dorr Company on August 21, 1917, the form here shown being that of Figure 3 of said patent.

Figure 1:
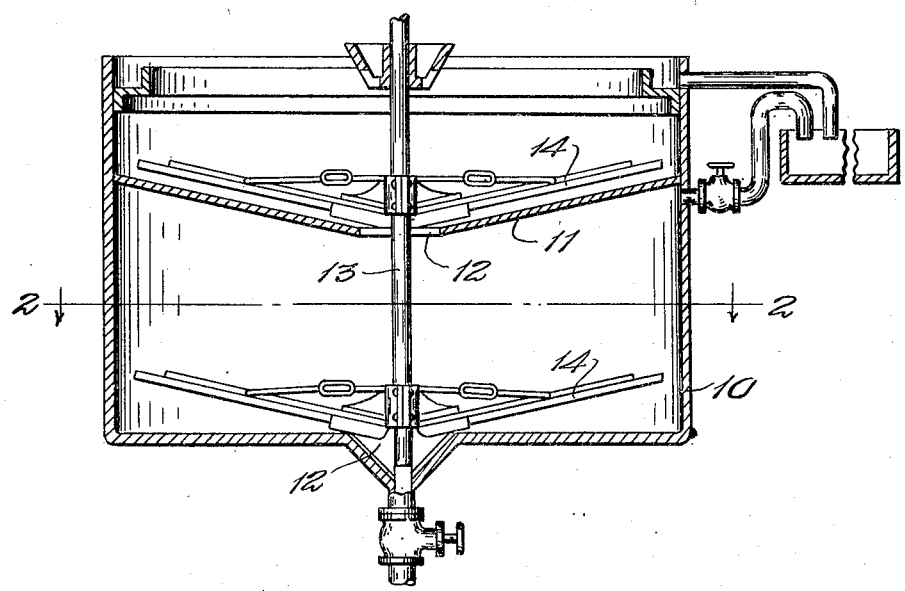
Figure 1 is a vertical sectional view taken diametrically through the axis of an apparatus for separating liquids from solids employing a scraper constructed in accordance with this invention.
Figure 2:
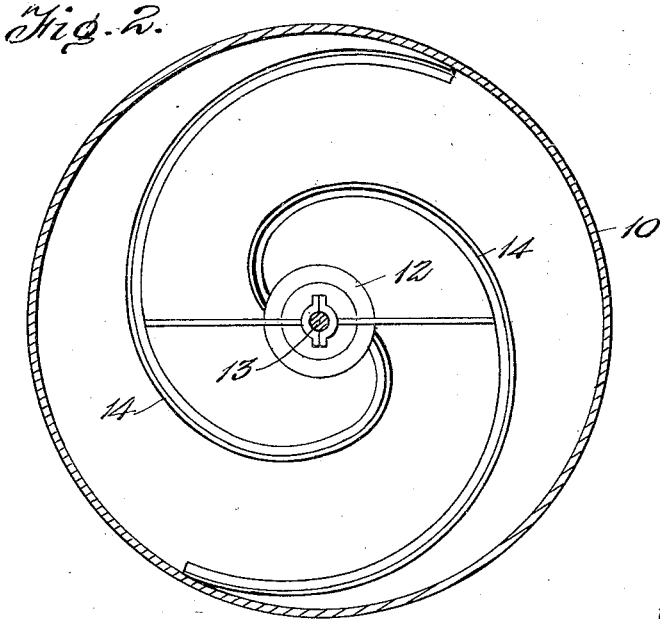
Figure 2 is a section on the line 2—2 of Figure 1.

Disregarding irrelevant details, it will be seen that the separator or thickener of the patent has a body formed by a cylindrical tank 10 wherein is connected frusto-conical partitions 11 in which is formed a central opening 12. Through this opening extends a vertical power driven shaft 13 whereon is fixed one or more scraper blades 14. This shaft revolves in the direction of the arrow in Figure 2 so that these blades force the material deposited on the partition inwardly from the wall of the tank to the opening 12 so that it may drop therethrough. This scraper is of peculiar curvature and in the form shown in Figure 3 has 120 degrees of its curvature adjacent the opening in the form of a parabolic spiral, the next 120 degrees being an Archimedean spiral and the outer 60 degrees, to the point of termination nearest the wall, being a logarithmic spiral.

Figure 4:
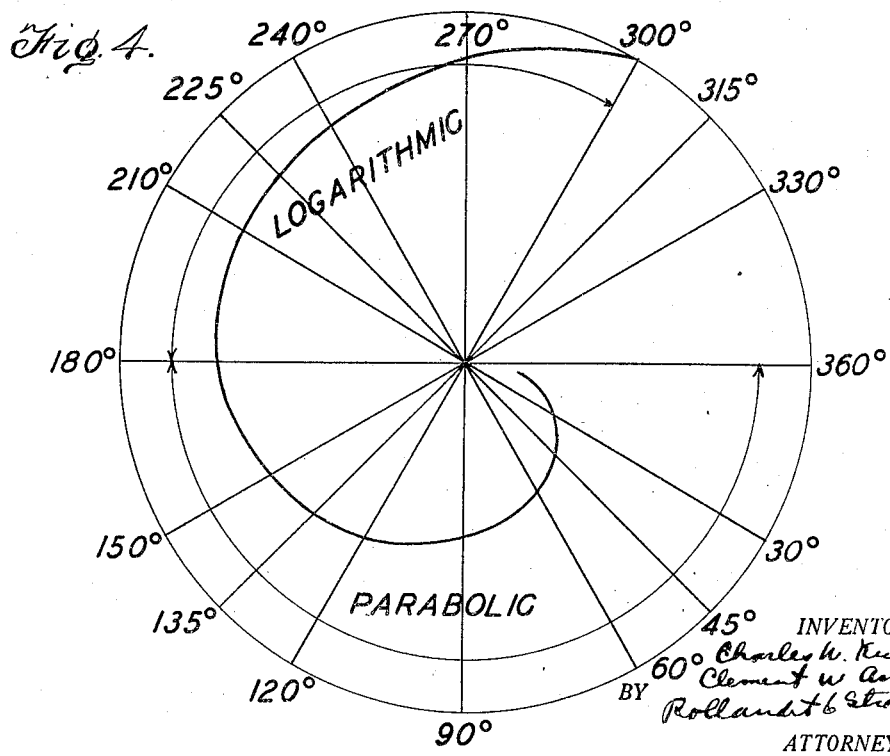
Figure 4 is a view similar to Figure 3 showing a second form of curve.

In the form shown in Figure 4, the inner parabolic spiral extends for 180 degrees and the remainder of the scraper is in the form of a logarithmic spiral extending 120 degrees.

Figure 5:
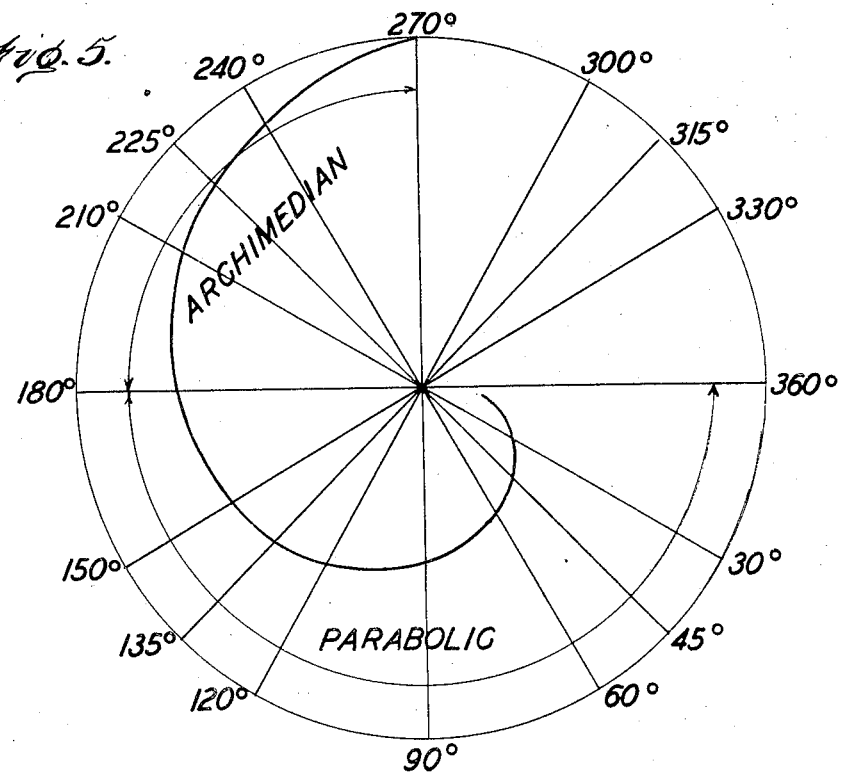
Figure 5 is a view similar to Figure 3 showing a third form of curve.

In the form shown in Figure 5, the inner spiral is a parabolic spiral of 180 degrees and the outer spiral is an Archimedean spiral of 120 degrees.

Figure 6:
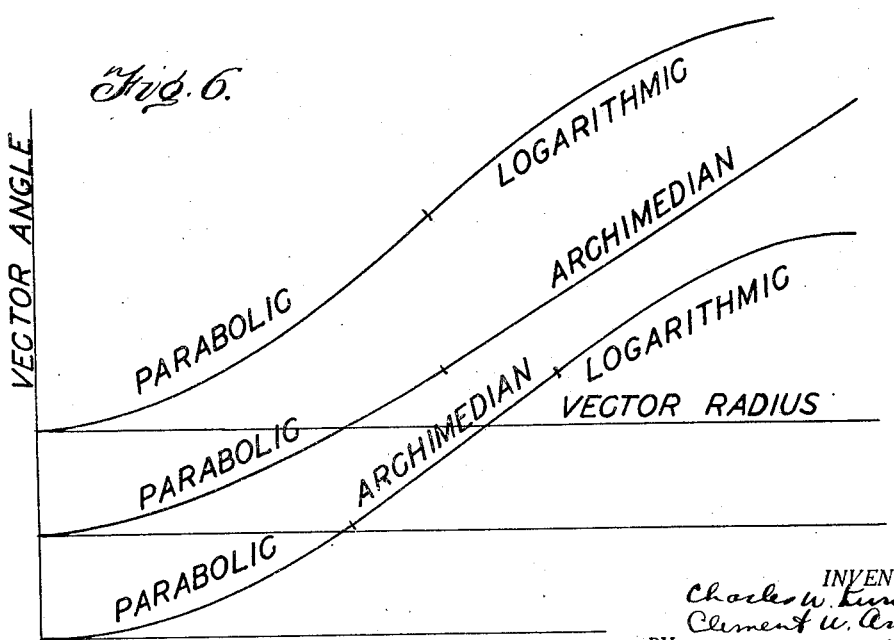
Figure 6 is an analytical diagram showing the three curves in their relation to the vector radius and vector angle as rectangular coordinates.

From a study of the diagram in Figure 6, it will be seen that the rate of change of the vector radius increases as it becomes shorter in the parabolic portion of each curve so that the scraping angle increases as the center is approached; the rate of change and scraping angle is constant through the Archimedean portion of the curve, and the rate of change of the vector angle and the scraping angle both decrease from the outer to the inner portion of the logarithmic curve.

It is to be noted that this device is used in connection with the separation of solids from liquids, the solids settling out of the liquids onto the partition. It will be seen that, at the outer part of the tank which is subject to most agitation by the movement of the blade or scraper, the form of the scraper is such as to move the solids toward the center in an unaccelerated manner and, with a logarithmic spiral, in a deaccelerated manner. Also, near the center where the agitation is less and the material thicker, the solids are moved toward the center in an accelerated manner. Thus, whichever of the improved forms of scraper blade is employed, there will be a constant delivery of material, to the opening, of uniform volume per second.

The arrangement of the curves, previously referred to and described, depends largely on the nature of the material under treatment. It is well known that the polar formulæ for these curves, in each instance, includes a constant. For example, the formulæ for the spiral of Archimedes is $X = A\Theta/V$, wherein $A$ is a constant. This constant, it is to be noted, is to be selected with reference to the material to be handled, so that while the curves will be true spirals of the character set forth, yet they are not restricted to any particular spirals of such characters.

It is to be noted that the compound spiral herein described is a great improvement over other spirals, or simple spirals for the same purpose, because the use of such compound spiral lessens, to a point of elimination, congestion at the center and, at the same time, greatly lessens the resistance to rotation, particularly at the outer portion of the scraper. It will be noted that this cannot occur with a simple spiral in which all of the spiral is constructed in accordance with the same law throughout, because such simple spiral will either cause congestion at the center, or will greatly resist rotation, especially at the outer portion. It is further to be understood that, while the spiral has been shown as applied to a thickener of the Dorr type, it is not to be restricted to any particular apparatus, but is adapted to be used in any apparatus wherein it is desirable to move material from the periphery to the center of a circular floor.

In Figure 6, the curves used are transposed to rectangular coordinates in order to more clearly bring out the scraping angles, the following equations being the equations of the curves:

Logarithmic $\dashline R = A\Theta$
Archimedean $\dashline R = A\Theta$
Parabolic $\dashline R = \sqrt[n]{A\Theta}$ wherein $R$ is the vector radius, $\Theta$ the vector angle, and $A$ and $n$ are constants selected for the particular case.

This figure shows very clearly that with the parabolic curve the scraping angle increases as the center is approached; the Archimedean curve has a constant scraping angle; and the logarithmic curve has a scraping angle which decreases as the radius vector becomes shorter.

Having thus described the invention, what is claimed as new is:—

1. A scraper blade for apparatus of the character described having the form of a spiral with the inner portion of the spiral curved to produce a constantly decreasing scraping angle from the center outward, said spiral being continued and curved to produce a constant scraping angle throughout the length of the continuation.

2. A scraper blade for apparatus of the character described having the form of a spiral with the inner portion of the spiral curved to produce a constantly decreasing scraping angle from the center outward, said spiral being continued and curved to produce a constant scraping angle throughout the length of the continuation, said spiral terminating in an outer portion curved to produce a constantly increasing scraping angle from the second portion to the outer extremity of the spiral.

3. A scraper blade for apparatus of the character described having the form of a spiral wherein the inner portion has a parabolic spiral curvature.

4. A scraper blade for apparatus of the character described having the form of a spiral wherein the inner portion has a parabolic spiral curvature, said spiral having a second portion adjacent the inner portion and having an Archimedean spiral curvature.

5. A scraper blade for apparatus of the character described having the form of a spiral wherein the inner portion has a parabolic spiral curvature, said spiral having a second portion adjacent the inner portion and having an Archimedean spiral curvature, said spiral further having an outer terminal portion of logarithmic curvature.

In testimony whereof we have affixed our signatures.

CHARLES W. KURIE, Jr.
CLEMENT W. ANKENY.